United States Patent
Ohashi et al.

(10) Patent No.: US 6,676,566 B2
(45) Date of Patent: Jan. 13, 2004

(54) CONTROL SYSTEM FOR AN AUTOMATIC TRANSMISSION OF A VEHICLE

(75) Inventors: Tatsuyuki Ohashi, Wako (JP); Masatoshi Shimizu, Wako (JP); Satoru Sunada, Wako (JP); Kouji Shibuya, Wako (JP); Osahide Miyamoto, Wako (JP); Takamichi Shimada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/983,275

(22) Filed: Oct. 23, 2001

(65) Prior Publication Data

US 2002/0049117 A1 Apr. 25, 2002

(30) Foreign Application Priority Data

Oct. 24, 2000 (JP) .......................................... 2000-323561

(51) Int. Cl.$^7$ .............................................. B60K 41/04
(52) U.S. Cl. ....................................... 477/115; 477/905
(58) Field of Search ................................ 477/115, 120, 477/123, 905; 74/336 R

(56) References Cited

U.S. PATENT DOCUMENTS

| 5,506,771 | A | * | 4/1996 | Chan et al. ............. 477/120 X |
| 5,527,237 | A | * | 6/1996 | Folwer et al. ............... 477/142 |
| 5,577,978 | A | * | 11/1996 | Stasik et al. .................. 477/78 |
| 5,662,548 | A | * | 9/1997 | Mori ..................... 477/905 X |
| 5,664,458 | A | * | 9/1997 | Stasik ..................... 477/80 X |
| 5,761,628 | A | * | 6/1998 | Steeby et al. ......... 74/336 R X |
| 5,875,410 | A | * | 2/1999 | Fowler et al. ............ 477/78 X |

FOREIGN PATENT DOCUMENTS

| EP | 0738844 | * | 10/1996 | ................. 477/120 |
| EP | 0784171 | * | 7/1997 | ................. 477/120 |
| JP | 7-286664 | | 10/1995 | |
| JP | 8-312775 | | 11/1996 | |
| JP | 2000-2328 | | 1/2000 | |

* cited by examiner

Primary Examiner—Roger Pang
(74) Attorney, Agent, or Firm—Arent Fox Kintner Plotkin & Kahn

(57) ABSTRACT

A control system for an automatic transmission of a vehicle is disclosed. The automatic transmission operates in a manual operating mode in which a shift position of the automatic transmission can be changed according to a shift instruction issued by a driver of the vehicle, or in an automatic operating mode in which the shift position is automatically selected. In the control system, a slow running intention of the driver is detected. A first shift position is set to a starting shift position at the time of starting the vehicle when the slow running intention of the driver is not detected in the manual operating mode. A second shift position which is lower in transmission gear ratio than the first shift position is set to the starting shift position when the slow running intention of the driver is detected in the manual operating mode.

12 Claims, 10 Drawing Sheets

FIG. 10
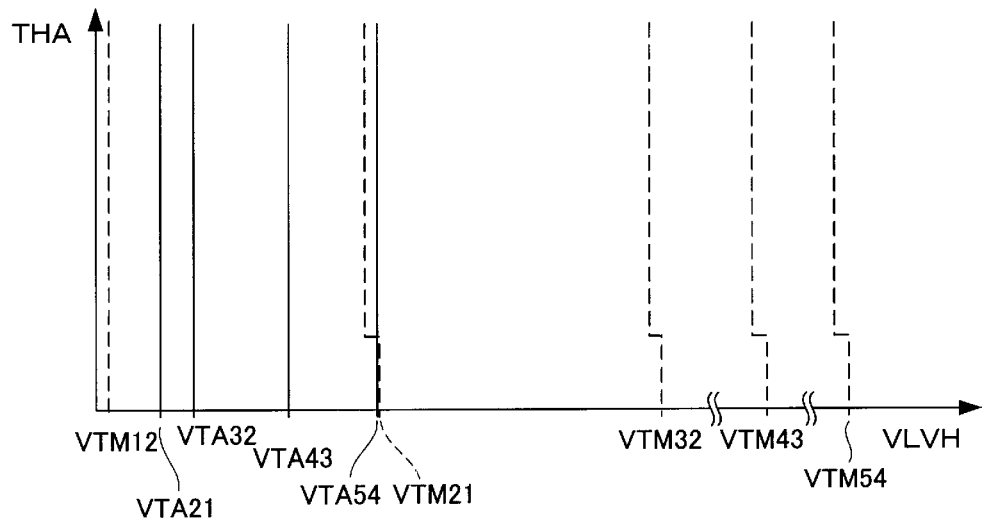
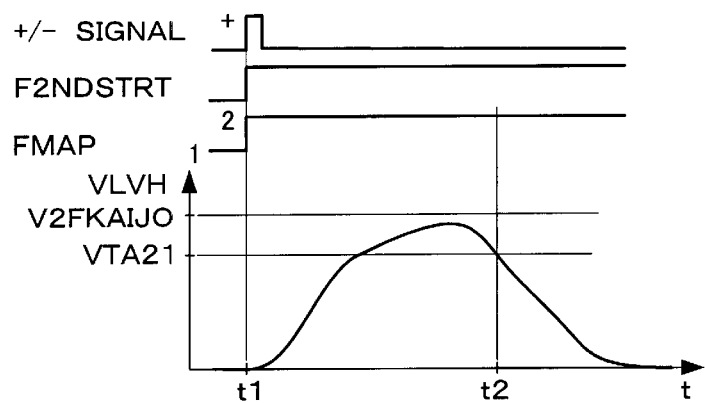
FIG. 11A
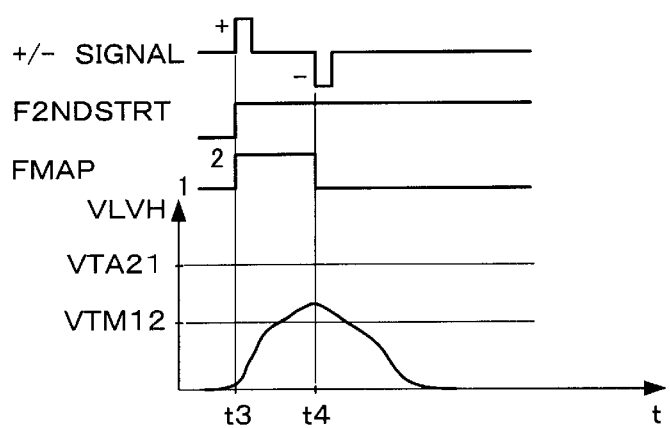
FIG. 11B

CONTROL SYSTEM FOR AN AUTOMATIC TRANSMISSION OF A VEHICLE

BACKGROUND OF THE INVENTION

The present invention relates to a control system for an automatic transmission of a vehicle, and particularly to a control system which perform a selection control of a shift position during the start of a vehicle.

During the operation of a vehicle in a traffic congestion, an inconvenience may occur where an acceleration/deceleration shock is increased which degrades driveability when the shift position is set to the 1st position. In order to cope with such an inconvenience, a technique of improving driveability of a vehicle during the operation of the vehicle in a traffic congestion has been disclosed, for example, in Japanese Patent Laid-open No. Hei 7-286664 (herewith "JP '664"). According to the control method disclosed in JP '664, the shift position is prevented from being shifted to the 1st position when it is determined that the vehicle is operating in a traffic congestion and that the vehicle is not in a hill-climbing condition.

However, the control method of the above related art can not accurately determine whether or not the vehicle is operating in a traffic congestion, and therefore the control method often erroneously determine that the vehicle is operating in a traffic congestion even though the vehicle is actually not operating in a traffic congestion. Accordingly, an inconvenience may occur when the control system of a vehicle unnecessarily prevent the shift position to change to the 1st position, and therefore the intention of the driver cannot be sufficiently reflected to the selected shift position.

BRIEF SUMMARY OF THE INVENTION

An objective of the present invention is to provide a control system for an automatic transmission of a vehicle, which is capable of preventing degradation of driveability of the vehicle during the operation of the vehicle in a traffic congestion, and is capable of accurately reflecting the intention of the driver with respect to a selected shift position.

In order to achieve the above objective, the present invention provides a control system for an automatic transmission of a vehicle. The automatic transmission is operable in a manual operating mode and can be changed according to a shift instruction issued by a driver of the vehicle. The automatic transmission is also operable in an automatic operating mode in which the shift position is automatically selected. The control system comprises a slow running intention detecting means and a starting shift position setting means. The slow running intention detecting means detects a slow running intention of the driver. The starting shift position setting means sets a first shift position to a starting shift position at the time of starting the vehicle when the slow running intention of the driver is not detected by the slow running intention detecting means in the manual operating mode, and sets a second shift position which is lower in transmission gear ratio than the first shift position to the starting shift position when the slow running intention of the driver is detected by the slow running intention detecting means in the manual operating mode.

With this configuration, the first shift position is set to the starting shift position at the time of starting the vehicle when the slow running intention of the driver is not detected in the manual operating mode, and the second shift position which is lower in transmission gear ratio than the first shift position is set to the starting shift position when the slow running intention of the driver is detected in the manual operating mode. Specifically, when the slow running intention of the driver is detected during a traffic congestion, the second shift position which is lower in transmission gear ratio than the first shift position, is set to the starting shift position, while when the slow running of the driver is not detected, the first shift position is set to the starting shift position. As a result, it is possible to prevent degradation of driveability during operating a vehicle in a traffic congestion in accordance with the clear slow running intention of the driver, and to obtain a good accelerating performance by selecting the first speed stage when the slow running intention of the driver is not detected.

The present invention provides another control system for an automatic transmission for a vehicle, comprising shift control means, slow running intention detecting means, slow running intention cancellation detecting means, and control mode selecting means. The slow running intention detecting means detects a slow running intention of the driver, and the slow running intention cancellation detecting means detects the cancellation of the slow running intention of the driver. The control mode selecting means selects a first control mode in which a first shift position is set to a starting shift position used at the time of starting the vehicle when the slow running intention of the driver is not detected by the slow running intention detecting means, and selects a second control mode in which a second shift position which is lower in transmission gear ratio than the first shift position is set to the starting shift position when the slow running intention of the driver is detected by the slow running intention detecting means. The control mode selecting means also selects the first control mode when the cancellation of the slow running intention of the driver is detected by the slow running intention cancellation detecting means. The shift control means controls the shift position of the automatic transmission in the control mode selected by the control mode selecting means.

With this configuration, the first control mode in which the first shift position is set to the starting shift position used at the time of starting the vehicle is selected, when the slow running intention of the driver is not detected, and the second control mode in which the second shift position which is lower in transmission gear ratio than the first shift position is set to the starting shift position is selected when the slow running intention of the driver is detected. Further, the first control mode is selected also when the cancellation of the slow running intention of the driver is detected. Specifically, when the slow running intention of the driver is detected during running in a traffic congestion, the second shift position which is lower in transmission gear ratio than the first shift position is set to the starting shift position, while when the slow running of the driver is not detected or the cancellation of the slow running intention is detected, the first shift position is set to the starting shift position. As a result, it is possible to prevent degradation of driveability during the operation of a vehicle in a traffic congestion in accordance with the clear slow running intention of the driver, and to obtain a good accelerating performance by selecting the first speed stage when the slow running intention of the driver is not detected or the cancellation of the slow running intention is detected.

Preferably, the slow running intention cancellation detecting means determines that the slow running intention of the driver is cancelled in at least one of the following cases: a case where a depressing rate of an accelerator pedal operated by the driver becomes greater than a predetermined rate; a case where a running speed of the vehicle becomes equal to or greater than a predetermined vehicle speed; a case where the selection of the first shift position is instructed by the driver; and a case where the selection of a third shift position which is lower in transmission gear ratio than the second shift position is instructed by the driver.

With this configuration, it is determined that the slow running intention of the driver is cancelled in at least one of the following cases: the case where the depressing rate of an accelerator pedal operated by the driver becomes greater than a predetermined rate, the case where the running speed of the vehicle becomes equal to or greater than a predetermined vehicle speed, the case where the selection of the first shift position is instructed by the driver, and the case where the selection of a third shift position which is lower in transmission gear ratio than the second shift position is instructed by the driver. Accordingly, it is possible to accurately determine the termination of the traffic congestion (or the vehicle has left the traffic congestion) or the cancellation of the slow running intention based on a clear intention of the driver, to thereby reflect the determination result to the setting of the starting shift position.

Preferably, the automatic transmission is operable in a manual operating mode in which a shift position of the automatic transmission can be changed according to a shift instruction issued by the driver, and the slow running intention detecting means detects the slow running intention of the driver when a shift-up of the automatic transmission is instructed by the driver in the manual operating mode in a condition where the first shift position is selected and a running speed of the vehicle is equal to or less than a predetermined low vehicle speed.

With this configuration, the slow running intention of the driver who drives the vehicle having the automatic transmission operable in the manual operating mode can accurately be detected.

BRIEF DESCRIPTION OF THE DRAWINGS

FIG. 10 is a diagram showing shift-down vehicle speeds and shift-down permission vehicle speeds in the M range control shown in FIG. 5;

FIGS. 11A and 11B are time charts showing actual operating examples of the M range control shown in FIG. 5.

DETAILED DESCRIPTION OF THE PREFERRED EMBODIMENTS

A preferred embodiment of the present invention will be described with reference to the drawings.

Figure 1:
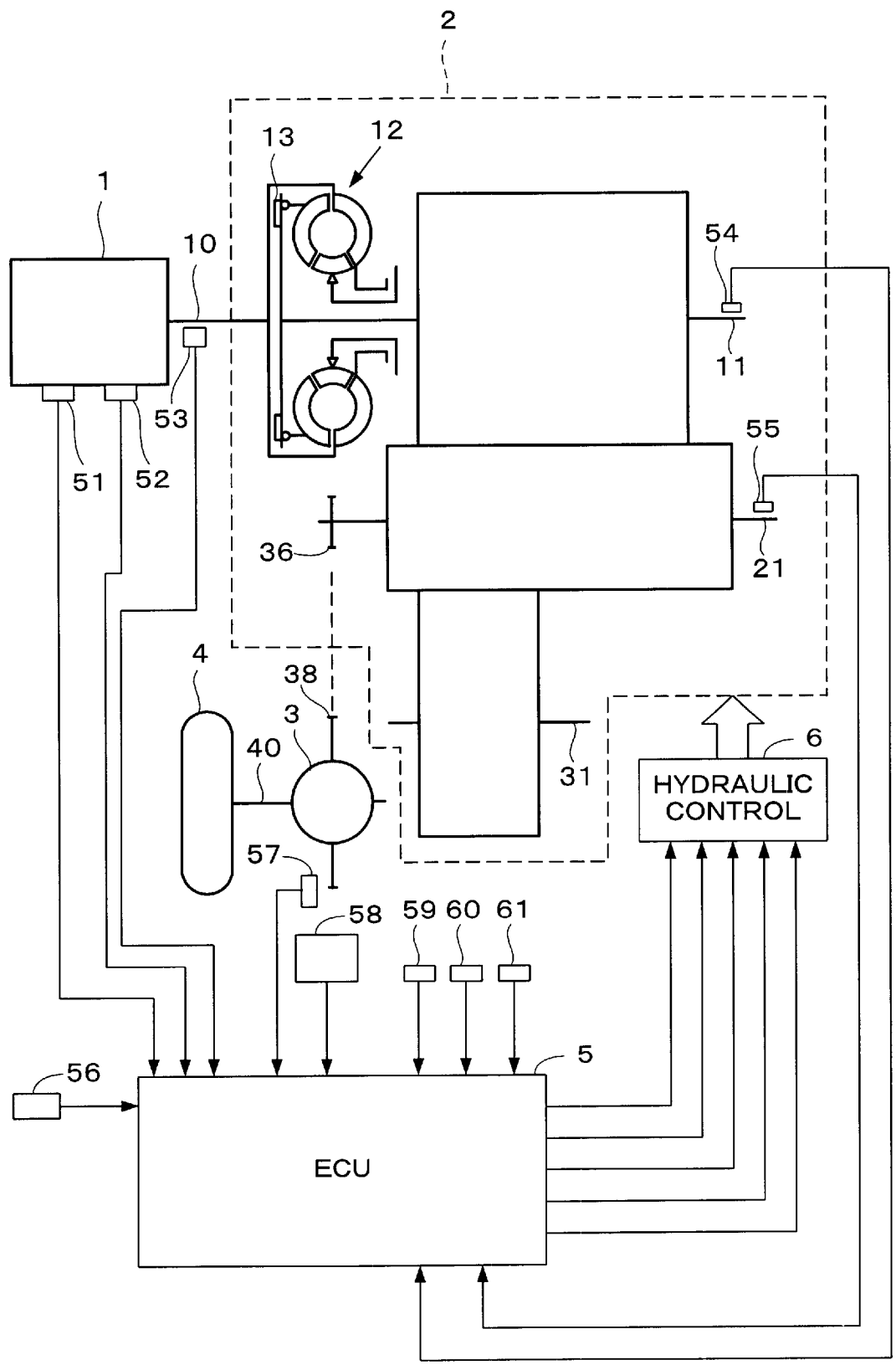
FIG. 1 is a schematic diagram showing a configuration of an automatic transmission of a vehicle and a control system therefor according to one embodiment of the present invention.

FIG. 1 is a schematic diagram showing a configuration of an automatic transmission for a vehicle and a control system therefor according to one embodiment of the present invention. An automatic transmission 2 for a vehicle is a parallel shaft type transmission capable of selecting one shift position from a selection of positions such as a reverse position and forward 1st to 5th shift positions. The automatic transmission 2 includes a main shaft 11 (an input shaft of the transmission), a torque converter 12, a lockup clutch 13, and a counter shaft 21 with a secondary shaft 31 which are provided in parallel with the main shaft 11. On each of the shafts 11, 21 and 31, gears and hydraulic clutchs (not shown) for coupling the gears to one of the shafts are supported.

A crankshaft 10 of an internal combustion engine (hereinafter, referred to as "engine") 1 is connected, via the torque converter 12 of the automatic transmission 2, to a main shaft 11.

The rotation of the counter shaft 21 is transmitted to a differential 3 via a final drive gear 36 and a final driven gear 38 meshing with the final drive gear 36, and further transmitted to a drive wheel 4 via a drive shaft 40.

A hydraulic control unit 6 is provided for hydraulically controlling the automatic transmission 2.

A throttle valve (not shown) arranged in an intake passage (not shown) of the engine 1 is provided with a throttle opening sensor 51 for detecting an opening angle THA of the throttle valve. A vehicle speed sensor 57 for detecting a vehicle speed VLVH on the basis of a rotational speed of the final driven gear 38 is provided near the final driven gear 38.

An input shaft rotational speed sensor 54 for detecting a rotational speed NM of the input shaft of the transmission 2 is provided near the main shaft 11, and an output shaft rotational speed sensor 55 for detecting a rotational speed NC of the output shaft of the transmission 2 is provided near the counter shaft 21.

A shift lever position switch 58 for detecting a range selected by the driver of the vehicle from at least five ranges P, R, N, D, and D3 is provided near a shift lever (not shown) mounted on a floor surface of a driver's seat of the vehicle. A crank angle sensor 53 for detecting an engine rotational speed NE is provided near the crankshaft 10 of the engine 1, and a water temperature sensor 52 for detecting a cooling water temperature TW of the engine 1 is provided at a suitable position of a cylinder block (not shown) of the engine 1.

An accelerator sensor 56 for detecting a depressed amount ACC of an accelerator pedal is provided near an accelerator pedal (not shown) on the floor surface of the driver's seat of the vehicle.

Output signals from the above-described sensors 51 to 57 and switch 58 are supplied to an ECU (Electronic Control Unit) 5.

The ECU 5 includes a CPU (Central Processing Unit), a memory, an input circuit, and an output circuit. The outputs from the above-described sensors are inputted to the CPU via the input circuit. The CPU performs a transmission control including a lockup clutch control according to a program stored in the memory and supplies a command signal to the hydraulic control unit 6 via the output circuit.

The hydraulic control unit 6 includes a shift solenoid for changing shift positions. The hydraulic control unit 6 further included a solenoid for performing on/off control of the lockup clutch 13, a solenoid for performing engagement force control of the lockup clutch 13, and a linear solenoid for controlling the above-described hydraulic clutch provided on the shafts 11, 21, and 31.

The ECU 5 determines a shift position according to the detected values from the sensors, and establishes the determined shift position by releasing/fastening the hydraulic clutch corresponding to the determined shift position via the hydraulic control unit 6. Thereafter, the ECU 5 performs the on-off control and engagement force control of the lockup clutch 13 of the torque converter 12.

Figure 2:
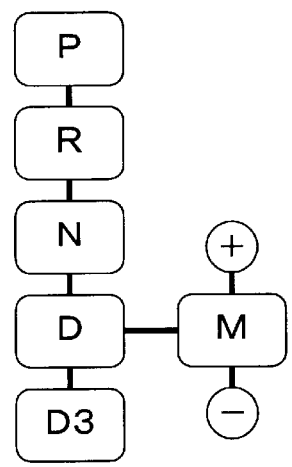
FIG. 2 is a diagram showing ranges selectable by a shift lever.

The automatic transmission according to this embodiment is operable in a manual operating mode in which the shift position is changeable according to a shift instruction issued by the driver of the vehicle. In addition, the automatic transmission according to this embodiment is operable in an automatic operating mode in which the shift position is automatically selected. FIG. 2 shows a P range used for parking, a R range used for reverse movement, a N range used for releasing the meshing states of the gears, a D range used for automatically selecting the optimum shift position among the 1st to 4th positions, a D3 range used for automatically selecting the optimum shift position among the 1st to 3rd positions, and an M range used for selecting the shift position according to a shift instruction issued by the driver. These ranges are selectable by the shift lever. Further, a plus (+) position and a minus (−) position is provided for allowing the driver to make a shift-up instruction and a shift-down instruction when the M range is selected. After the driver operates the shift lever from a neutral position at the center of the M range to the (+) position or the (−) position, the shift lever is automatically returned to the neutral position.

Furthermore, the present invention provides a M range switch 59 for detecting the selection of the M range, a shift-up instruction switch 60 for detecting the movement of the shift lever to the (+) position, and a shift-down instruction switch 61 for detecting the movement of the shift lever to the (−) position. Detection signals from these switches are supplied to the ECU 5.

Figure 3:
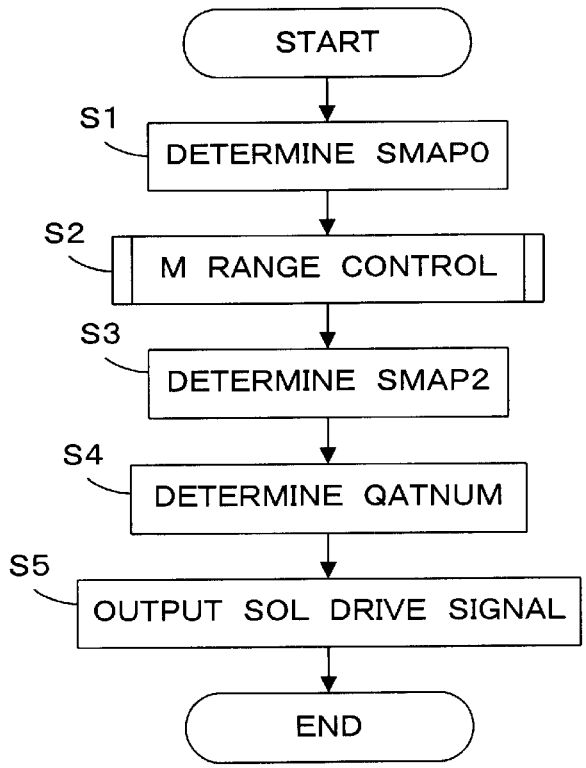
FIG. 3 is a flow chart showing a configuration of the control process for the automatic transmission.

FIG. 3 is a flow chart showing an automatic transmission control process executed by the CPU of the ECU 5. This process is executed by the CPU at predetermined time intervals (for example, 20 msec).

Figure 4:
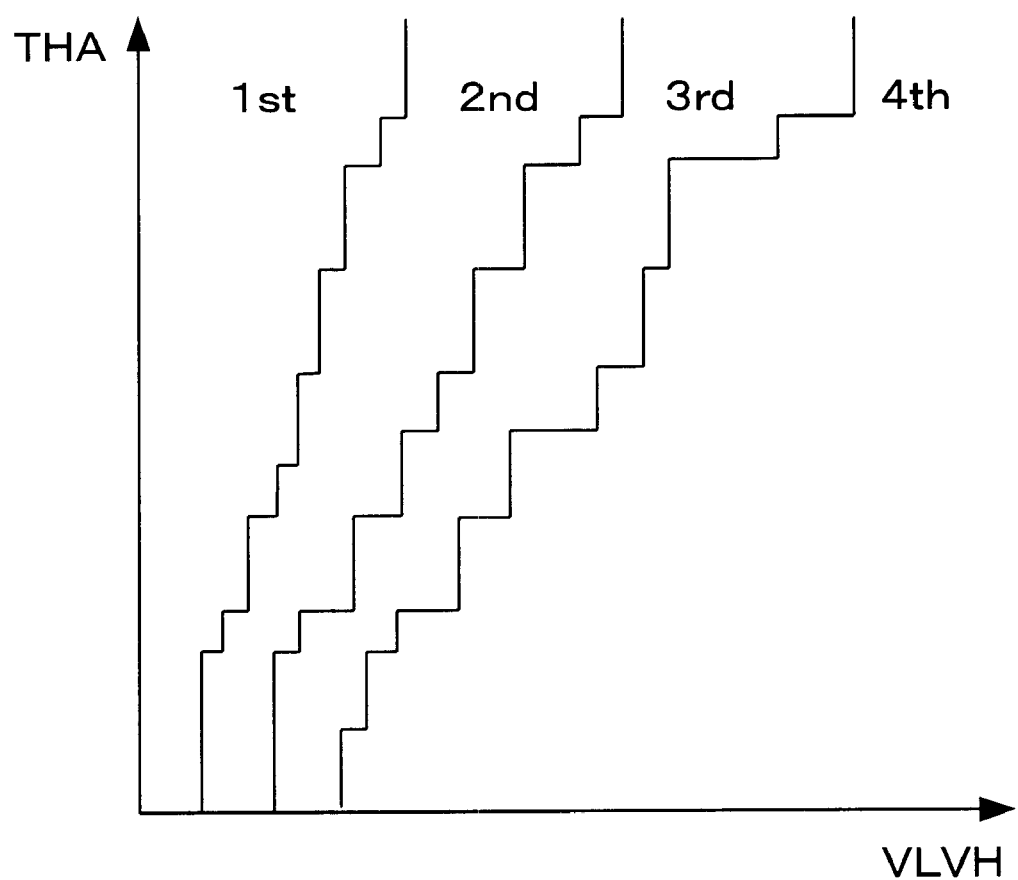
FIG. 4 is a diagram showing a shift map retrieved according to a vehicle speed and a throttle valve opening.

In step S1, a basic shift position SMAP0 is determined by retrieving a shift map as shown in FIG. 4 according to the throttle opening THA and the vehicle speed VLVH. Subsequently, an M range control for determining a corrected shift position SMAP1 for the case where the M range is selected is executed (step S2). The M range control process is specifically shown in FIG. 5.

In step S3 of FIG. 4, an output shift position SMAP2 is determined according to the basic shift position SMAP0 and the corrected shift position SMAP1. When the M range is selected, the corrected shift position SMAP1 is usually set to the output shift position SMAP2. In the special case where a fail-safe operation is performed for example, a shift position which is different from the corrected shift position SMAP1 is set to the output shift position SMAP2.

The output shift position SMAP2 is then compared with an actual shift position. A control mode parameter QATNUM for indicating whether the present shift position should be held "shifted up" or "shifted down" is then determined (step S4). Thereafter, a drive signal in accordance with the control mode parameter QATNUM determined in step S4 is outputted to the hydraulic control unit 6 (step S5).

Figure 5:
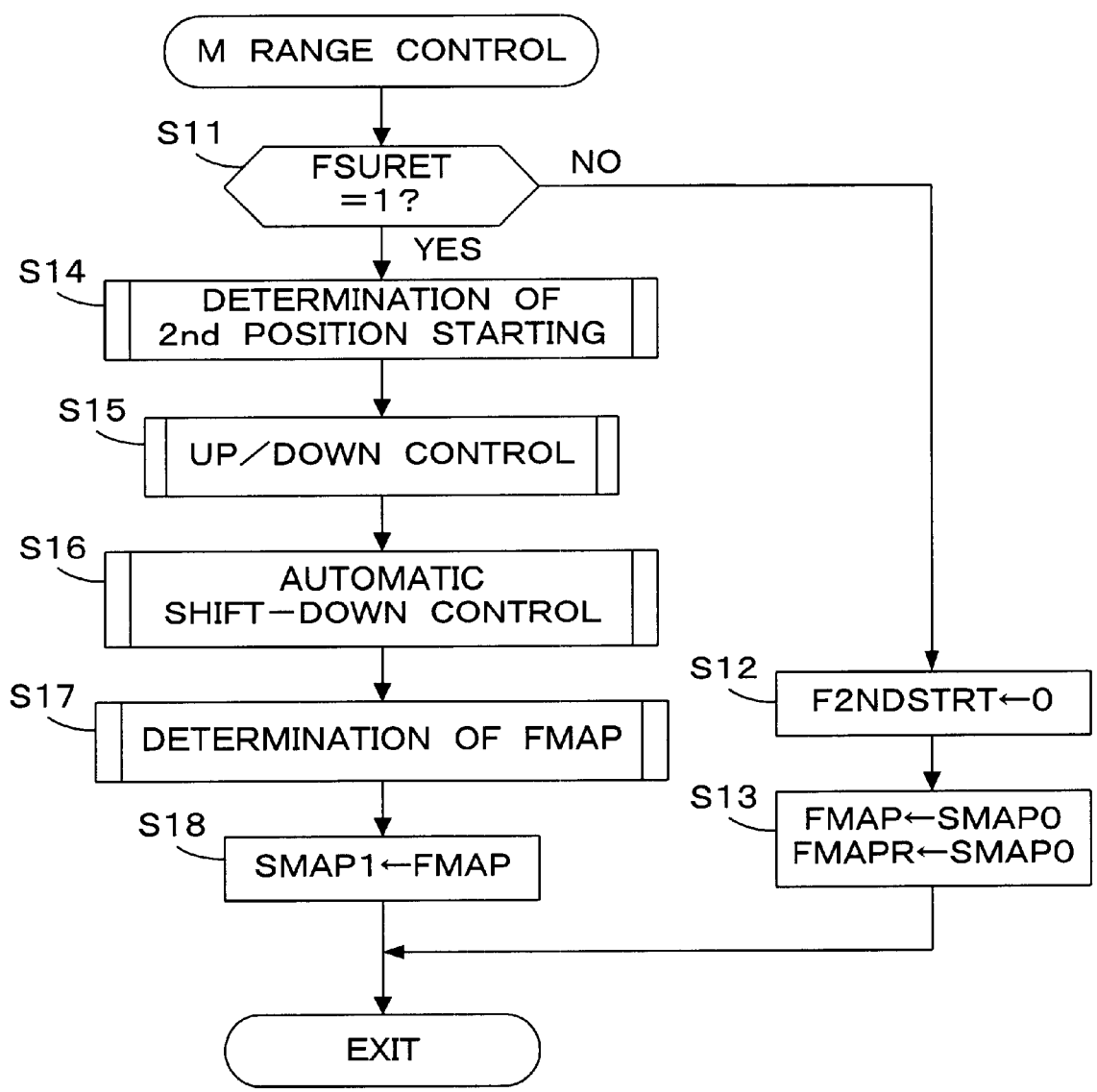
FIG. 5 is a flow chart showing a M-range control process executed in the case where the M-range shown in FIG. 2 is selected.

FIG. 5 is a flow chart showing a process of the M range control executed in step S2 as shown in FIG. 3.

Step S11 determines whether or not an M range flag FSURET is "1". When the M range flag FSURET is set to "1", this indicates that the M range is selected. If flag FSURET is set to "0", then a 2nd position starting flag F2NDSTRT is set to "0" (step S12). When the 2nd position starting flag F2NDSTRT is set to "1", this indicates that a 2nd position starting mode is selected. The 2nd position starting mode is an operating mode in which the 2nd position is selected at the starting of the vehicle.

Next, an instructed shift position FMAP from the time of selecting the M range, and a target shift position FMAPR from the time of selecting M range are both set to the basic shift position SMAP0 (step S13). Accordingly, each of the instructed shift position FMAP and the target shift position FMAPR is equal to the basic shift position SMAP0 immediately after the selected range is changed from the D range to the M range.

Figure 6:
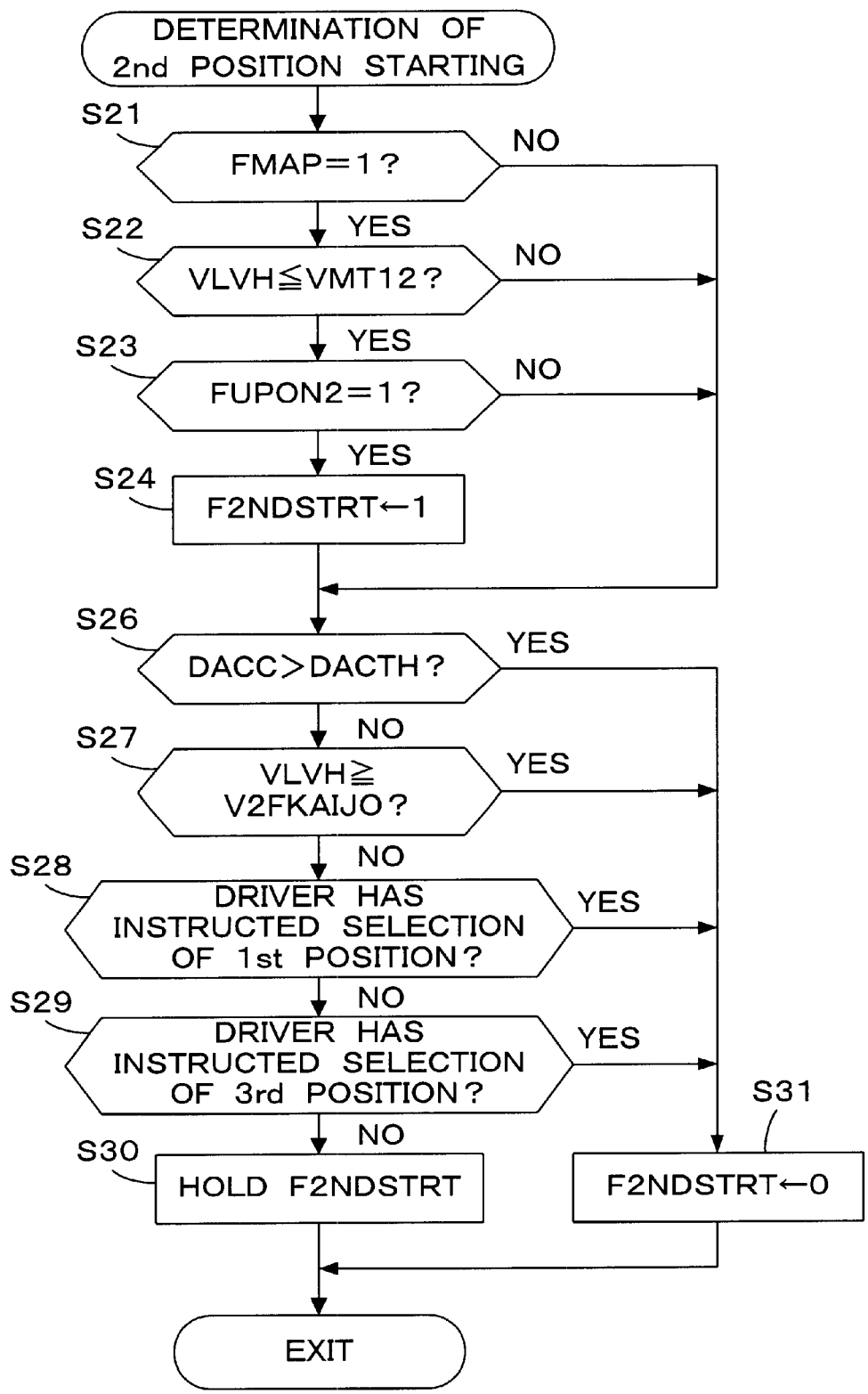
FIG. 6 is a flow chart showing a process for determining whether or not the 2nd position starting is performed.
Figure 7:
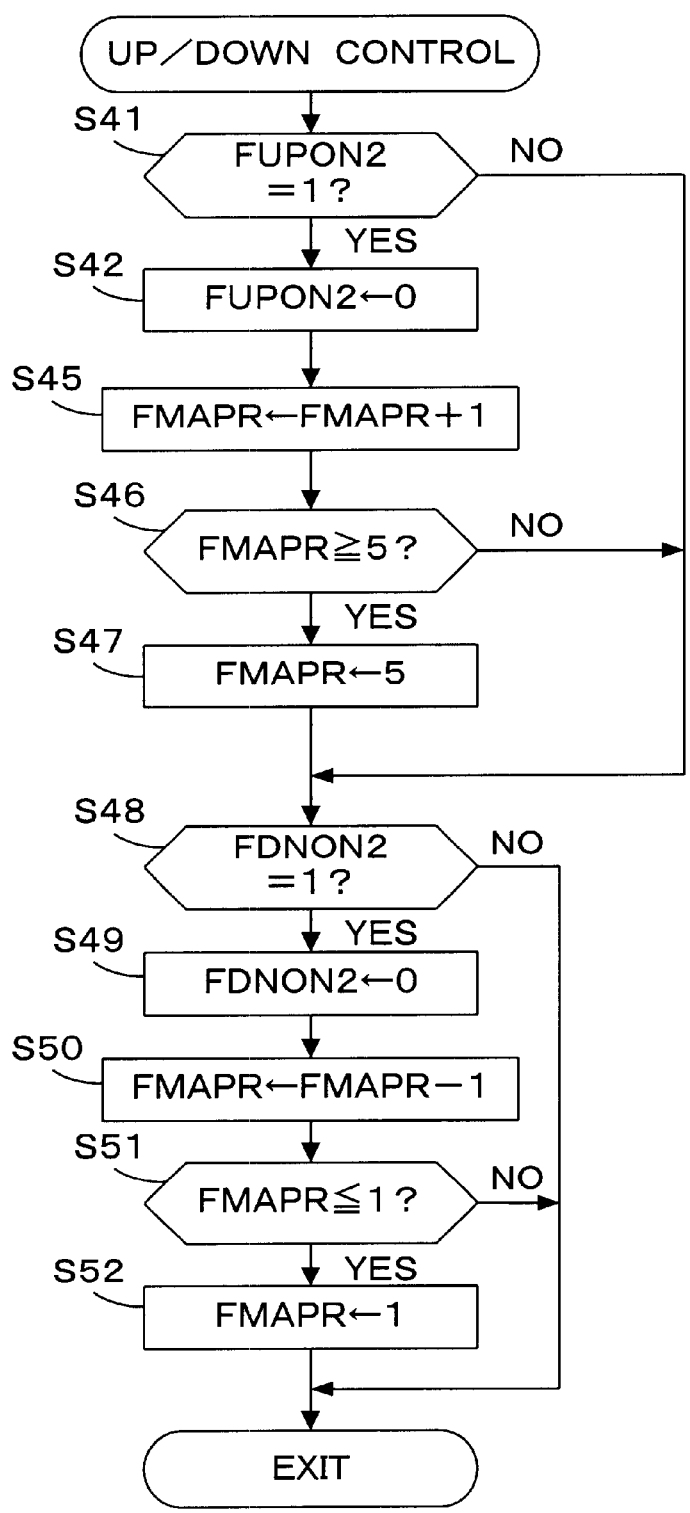
FIG. 7 is a flow chart showing a process for setting a target shift position according to a shift-up instruction or a shift-down instruction issued by the driver.

If FSURET is "1" in step S11, indicating that the M range is selected, then a 2nd position starting determination process as shown in FIG. 6 is executed (step S14). In this process, the 2nd position starting flag F2NDSTRT is either set or reset. In step S15, an UP/DOWN control process as shown in FIG. 7 is executed. In this process, the target shift position FMAPR is set according to the on-operation of the shift-up instruction switch 60 or the shift-down instruction switch 61.

Figure 8:
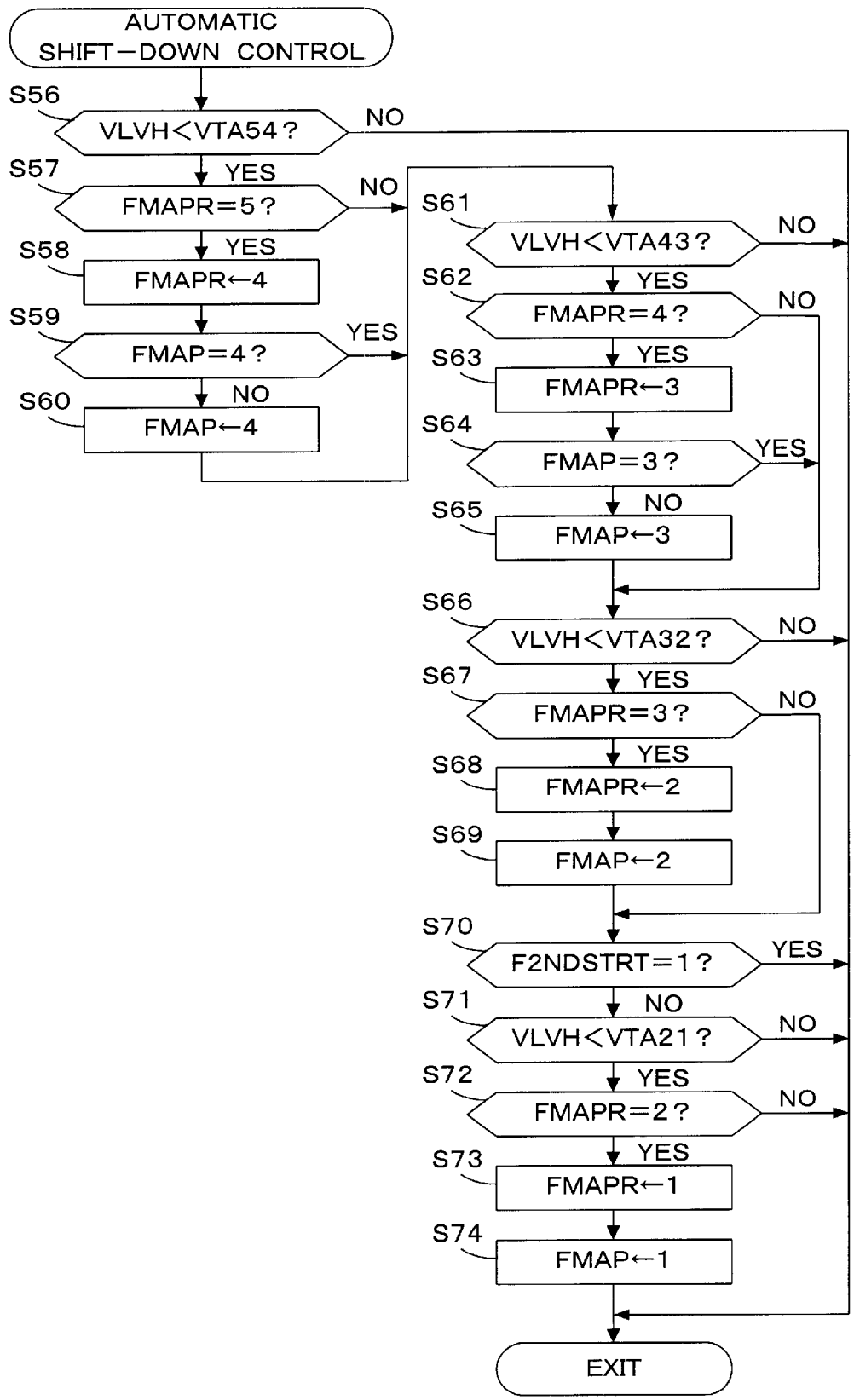
FIG. 8 is a flow chart showing a process for performing shift-down control according to a vehicle speed.
Figure 9:
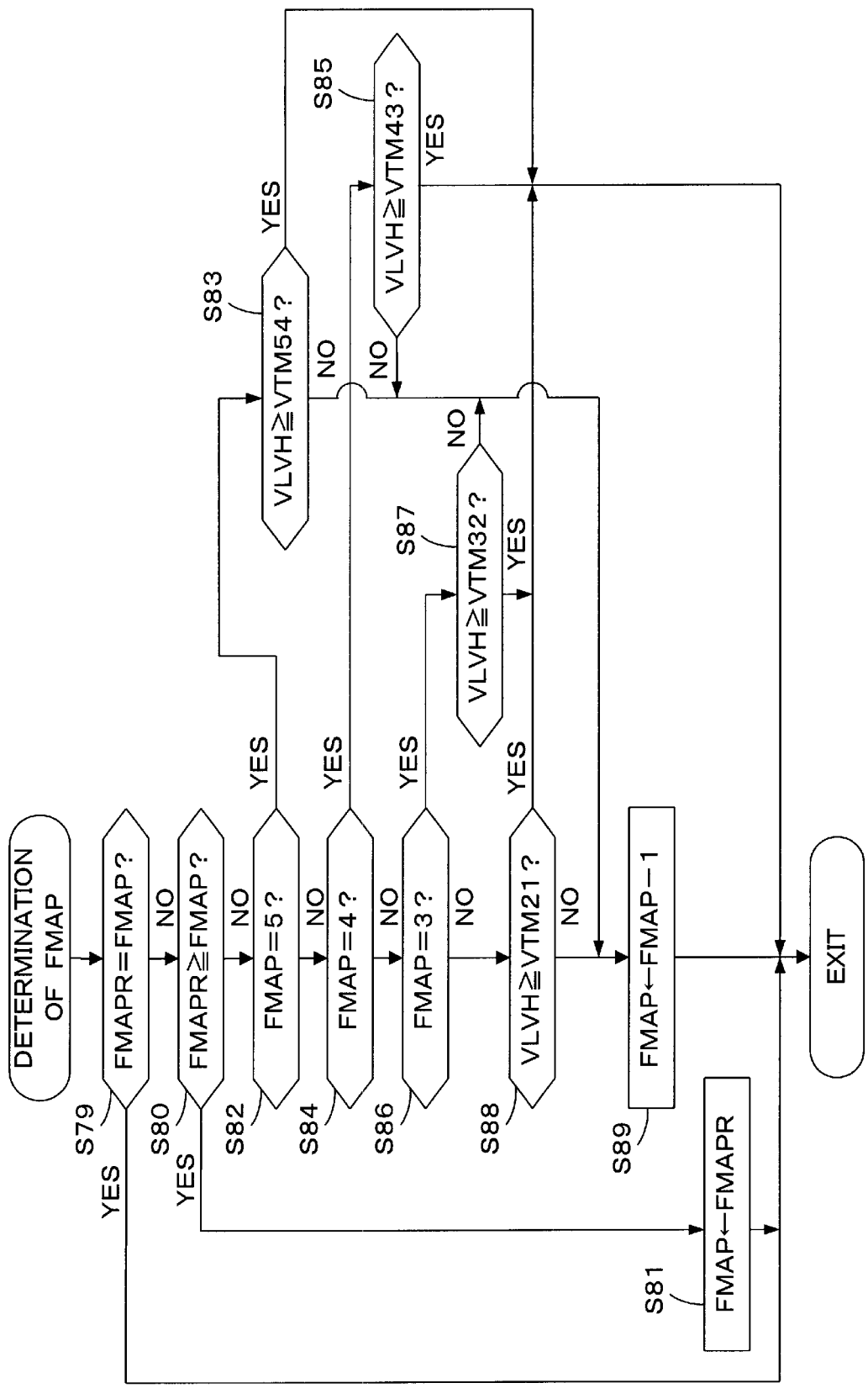
FIG. 9 is a flow chart showing a process for determining the next instructed shift position according to a target shift position (FMAPR) and an instructed shift position (FMAP)

In step S16 of FIG. 5, an automatic shift-down control process as shown in FIG. 8 is executed. In this process, a shift-down control based on the vehicle speed VLVH is performed separately from the shift-down instruction from the driver. Further in step S17, a FMAP determination process as shown in FIG. 9 is executed. In this process, the next instructed shift position FMAP is determined according to the target shift position FMAPR and the present instructed shift position FMAP. Subsequently, the corrected shift position SMAP1 is set to the instructed shift position FMAP (step S18). This process ends upon completion of step S18.

FIG. 6 is a flow chart showing a process of the 2nd position starting determination process executed in step S14 shown in FIG. 5. FIG. 10 is a diagram showing shift-down vehicle speeds VTA21, VTA32, VTA43 and VTA54. Furthermore, FIG. 10 shows a 1st-to-2nd shift-up permission vehicle speed VTM12, and shift-down permission vehicle speeds VTM21, VTM32, VTM43 and VTM54. These vehicle speeds are set for the condition where the M range is selected. In the following description, FIG. 10 will be referred to along with FIG. 6.

Step S21 of FIG. 6 determines whether or not the instructed shift position FMAP is the 1st position. If the instructed shift position FMAP is the 1st position, then it is determined whether or not the vehicle speed VLVH is equal to or less than the 1st-to-2nd shift-up permission vehicle speed VMT12 (e.g. 2 km/h, see FIG. 10) (step S22). If VLVH is less than or equal to VMT12, then it is determined whether or not a shift-up flag FUPON2 is "1" (step S23). When the flag FUPON2 is set to "1", the shift-up instruction switch 60 is turned on. If the answer to any of steps S21 to S23 is negative (NO), then it is determined that the driver does not have any intentions to slow the vehicle, and the process immediately goes to step S26. However, if the answers to all of steps S21 to S23 are affirmative (YES), then it is determined that the driver does indeed have the intention to slow the vehicle, and therefore the 2nd position starting flag F2NDSTRT is set to "1", and the operating mode is set to the 2nd position starting mode for starting the vehicle using the 2nd position (step S24). Thereafter, the process goes to step S26.

Step S26 of FIG. 6 determines whether or not an increment amount (depressing rate) DACC per unit time of the depressed amount ACC of the accelerator pedal is greater than a predetermined threshold value DACTH. If DACC is greater than DACTH, then the determination that the driver intends to slow the vehicle is cancelled. Thereafter, the 2nd position starting flag F2NDSTRT is set to "0" (step S31) which cancels the 2nd position starting mode.

If DACC is less than or equal to DACTH in step S26, then it is determined whether or not the vehicle speed VLVH is equal to or greater than a 2nd position start cancellation vehicle speed V2FKAIJO (e.g. 30 km/h) (step S27). If VLVH is greater than or equal to V2FKAIJO, then the determination that the driver intends to slow the vehicle is cancelled. Thereafter, the process goes to step S31, in which the 2nd position starting mode is also cancelled.

If VLVH is less than V2FKAIJO in step S27, then it is determined whether or not the driver has instructed the selection of the 1st position. More specifically, it is determined whether or not the driver has instructed the shift-down in the 2nd position selected condition (step S28). If the driver has instructed the selection of the 1st position, then the determination that the driver intends to slow the vehicle is cancelled. Thereafter, the process goes to step S31, in which the 2nd position starting flag F2NDSTRT is set to "0". If however the driver has not instructed the selection of the 1st position, then it is determined whether or not the driver has instructed the selection of the 3rd position. More specifically, it is determined whether or not the driver has instructed the shift-up in the 2nd position selected condition (step S29). If the driver has instructed the selection of the 3rd position, then the determination that intends to slow the vehicle is cancelled. Thereafter, the process goes to step S31, in which the 2nd position starting mode is cancelled.

As described above, if the answer to any of steps S26 to S29 is affirmative (YES) when the 2nd position starting mode is selected, then the 2nd position starting mode is cancelled in step S31.

If the answers to all of steps S26 to S29 are negative (NO), the value of the 2nd position starting flag F2NDSTRT is held (step S30). In other words, if the 2nd position starting mode is selected, then the mode is maintained.

According to the process shown in FIG. 6 and described above, if the 1st position is selected for a very-low vehicle speed running condition, and if the vehicle speed VLVH is equal to or less than the 1st-to-2nd shift-up permission vehicle speed VMT12, and also if the driver has instructed the selection of the 2nd position, then based on these conditions, it is determined that the driver intends to slow the vehicle. Thereafter, the operating mode is shifted to the 2nd position starting mode. As a result, it is possible to avoid rapid acceleration/deceleration when the vehicle is operating in a traffic congestion, to thereby maintain good driveability.

In steps S26 to S29 of FIG. 6, the accelerating intention of the driver is determined according to the depressing rate of the accelerator pedal (rate of change DACC in the depressed amount of the accelerator pedal). Also it is determined during these steps that the slow running intention of the driver is cancelled when the vehicle speed VLVH becomes equal to or greater than the 2nd position start canceling vehicle speed V2FKAIJO, and when the driver has instructed the selection of the 1st position, or when the driver has instructed the selection of the 3rd position, so that the 2nd position starting mode is cancelled. As a result, in the case where the driver clearly intends to accelerate the vehicle to escape from the traffic congestion (for example, enter a byroad), but also in the case where the traffic congestion gradually eases up so that the vehicle naturally leaves the traffic congestion, the operating mode is set to the normal 1st position starting mode, which makes it possible to rapidly accelerate the vehicle.

FIG. 7 is a flow chart showing the UP/DOWN control processing executed in step S15 shown in FIG. 4.

Step S41 of FIG. 7 determines whether or not the shift-up flag FUPON2 is "1". If FUPON2 is "0", indicating that the shift-up has not been instructed by the driver, then the process immediately goes to step S48. If FUPON2 is "1", then the shift-up flag FUPON2 is returned to "0" (step S42), and therefore the target shift position FMAPR is incremented by "1" (that is, the target shift position FMAPR is shifted up by one) (step S45). The process thereafter goes to step S46.

Step S46 of FIG. 7 determines whether or not the target shift position FMAPR is equal to or greater than "5" (the 5th position). If FMAPR is less than "5", then the process immediately goes to step S48. If FMAPR is greater than or equal to "5", then the target shift position FMAPR is set to the 5th position (step S47). The process thereafter goes to step S48.

Step S48 determines whether or not a shift-down flag FDNON2 is set to "1". When the flag FDNON2 is set to "1", this is an indication that the shift-down instruction switch 61 is turned on. However, if FDNON2 is "0", then the process immediately ends. If FDNON2 is set to "1", (indicating that the shift-down has been instructed by the driver), then the shift-down flag FDNON2 is returned to "0" (step S49), and the target shift position FMAPR is decremented by "1" (that is, the target shift position FMAPR is shifted down by one) (step S50). Then, it is determined whether or not the target shift position FMAPR is equal to or less than "1" (the 1st position) (step S51). If FMAPR is greater than "1", then the process immediately ends. If FMAPR is less than or equal to 1, then the target shift position FMAPR is set to the 1st position (step S52), and the process ends.

According to the process shown in FIG. 7, the target shift position FMAPR is set according to the outputs from the shift-up instruction switch 60 and the shift-down instruction switch 61.

FIG. 8 is a flow chart showing the automatic shift-down control process executed in step S16 as shown in FIG. 4.

Step S56 determines whether or not the vehicle speed VLVH is lower than the 5th-to-4th shift-down vehicle speed VTA54 (e.g. 50 km/h, see FIG. 10). If VLVH is greater than or equal to VTA54, then the process immediately ends. If VLVH is less than VTA54, then it is determined whether or not the target shift position FMAPR is the 5th position (step S57). If the target shift position FMAPR is not the 5th position, then the process immediately goes to step S61. If the target shift position FMAPR is the 5th position, then the target shift position FMAPR is set to the 4th position (step S58). Subsequently, it is determined whether or not the instructed shift position FMAP is set to the 4th position (step S59). If the instructed shift position FMAP is set to the 4th position, then the process immediately goes to step S61. If the instructed shift position FMAP is not set to the 4th position, then the instructed shift position FMAP is set to the 4th position (step S60). Thereafter, the process goes to step S61.

Step S61 determines whether or not the vehicle speed VLVH is lower than the 4th-to-3rd position shift-down vehicle speed VTA43 (e.g. 30 km/h, see FIG. 10). If VLVH is greater than or equal to VTA43, then the process immediately ends. If VLVH is less than VTA43, then it is determined whether or not the target shift position FMAPR is set to the 4th position (step S62). If the target shift position FMAPR is not set to the 4th position, the the process immediately goes to step S66. If the target shift position FMAPR is set to the 4th position, then the target shift position FMAPR is set to the 3rd position (step S63). Subsequently, it is determined whether or not the instructed shift position FMAP is set to the 3rd position (step S64). If the instructed shift position FMAP is set to the 3rd position, then the process immediately goes to step S66. If the instructed shift position FMAP is not set to the 3rd position, then the instructed shift position FMAP is set to the 3rd position (step S65). Then, the process goes to step S66.

Step S66 determines whether or not the vehicle speed VLVH is lower than the 3rd-to-2nd shift-down vehicle speed VTA32 (e.g. 15 km/h, see FIG. 10). If VLVH is greater than or equal to VTA32, then the process immediately ends. If VLVH is less than VTA32, then it is determined whether or not the target shift position FMAPR is the 3rd position (step S67). If the target shift position FMAPR is not the 3rd position, then the process immediately goes to step S70. If the target shift position FMAPR is the 3rd position, then the target shift position FMAPR is set to the 2nd position (step S68), and the instructed shift position FMAP is also set to the 2nd position (step S69).

Step S70 determines whether or not the 2nd position starting flag F2NDSTRT is "1". If F2NDSTRT is "1" which indicates that the 2nd position starting mode is selected, then the process immediately ends since the shift-down to the 1st position is not performed in the 2nd position starting mode.

If however the F2NDSTRT is "0", then it is determined whether or not the vehicle speed VLVH is lower than the 2nd-to-1st position shift-down vehicle speed VTA21 (e.g. 10 km/h, see FIG. 10). If VLVH is greater than or equal to VTA21, then the process immediately ends. If VLVH is less than VTA21, then it is determined whether or not the target shift position FMAPR is the 2nd position (step S72). If the target shift position FMAPR is not the 2nd position, then the process immediately ends. If the target shift position FMAPR is the 2nd position, then the target shift position FMAPR is set to the 1st position (step S73), and the instructed shift position FMAP is also set to the 1st position (step S74).

According to the process shown in FIG. 8 and described above, even if the M range is selected, the shift-down is automatically performed according to the vehicle speed VLVH. However, in the 2nd position starting mode (F2NDSTRT is "1"), the automatic shift-down from the 2nd position to the 1st position is inhibited by step S70.

FIG. 9 is a flow chart show in the FMAP determination process executed in step S17 as shown in FIG. 3.

Step S79 determines whether or not the target shift position FMAPR is equal to the instructed shift position FMAP. If FMAPR is equal to FMAP, then the process immediately ends. If the target shift position FMAPR is different from the instructed shift position FMAP, then it is determined whether or not the target shift position FMAPR is equal to or greater than the instructed shift position FMAP (step S80). If FMAPR is greater than or equal to FMAP, then the instructed shift position FMAP is set to the target shift position FMAPR (step S81). Thereafter, the process ends.

If FMAPR is less than FMAP in step S80, then it is determined whether or not the instructed shift position FMAP is the 5th position (step S82). If the instructed shift position FMAP is the 5th position, then it is determined whether or not the vehicle speed VLVH is equal to or greater than the 5th-to-4th shift-down permission vehicle speed VTM54 (e.g. 200 km/h, see FIG. 10) (step S83). If VLVH is greater than or equal to VTM54, then the shift-down is not permitted, and the process immediately ends. If VLVH is less than VTM54, then the instructed shift position FMAP is shifted down by one (step S89), and the process thereby ends.

If the instructed shift position FMAP is not the 5th position in step S82, then it is determined whether or not the instructed shift position FMAP is the 4th position (step S84). If the instructed shift position FMAP is the 4th position, then it is determined whether or not the vehicle speed VLVH is equal to or greater than the 4th-to-3rd position shift-down permission vehicle speed VTM43 (e.g. 150 km/h, see FIG. 10) (step S85). If VLVH is greater than or equal to VTM43, then the shift-down is not permitted, and the process immediately ends. If VLVH is less than VTM43, the the instructed shift position FMAP is shifted down by one (step S89), and the process ends.

If the instructed shift position FMAP is not the 4th position in step S84, then it is determined whether or not the instructed shift position FMAP is the 3rd position (step S86). If the instructed shift position FMAP is the 3rd position, then it is determined whether or not the vehicle speed VLVH is equal to or greater than the 3rd-to-2nd position shift-down permission vehicle speed VTM32 (e.g. 100 km/h, see FIG. 10) (step S87). If VLVH is greater than or equal to VTM32, then the shift-down is not permitted, and the process immediately ends. If VLVH is less than VTM32, then the instructed shift position FMAP is shifted down by one (step S89), and the process ends.

If the instructed shift position FMAP is not the 3rd position in step S86, then the instructed shift position FMAP is the 2nd position. It is determined whether or not the vehicle speed VLVH is equal to or greater than the 2nd-to-1st position shift-down permission vehicle speed VTM21 (e.g., 50 km/h, see FIG. 10) (step S88). If VLVH is greater than or equal to VTM21, then the shift-down is not permitted, and the process immediately ends. If VLVH is less than VTM21, then the instructed shift position FMAP is shifted down by one (step S89), and the process ends.

According to the process shown in FIG. 9 and described above, if the target shift position FMAPR is less than the instructed shift position FMAP, then the shift-down is performed when the vehicle speed VLVH is lower than the shift-down permission vehicle speeds VTM54, VTM43, VTM32 or VTM21 corresponding to the present shift position. In other words, even if the shift-down is instructed by the driver, the shift-down is not performed when the vehicle speed VLVH is equal to or greater than the shift-down permission vehicle speed.

FIGS. 11A and 11B are time charts illustrating operational examples in which the M range is selected. When the shift-up is instructed by the driver (at a time t1 or t3) during the condition where the vehicle speed VLVH is very low and the instructed shift position FMAP is the 1st position, the shift-up to the 2nd position is performed. Thereafter, the 2nd position starting flag F2NDSTRT is set to "1" so that the operating mode is changed to the 2nd position starting mode. In the example shown in FIG. 11A, the vehicle speed VLVH does not reach the 2nd position start releasing vehicle speed V2FKAIJO. Accordingly, the shift position is kept at the 2nd position after a time t2 at which the vehicle speed VLVH decreases to the 2nd-to-1st position shift-down vehicle speed VTA21. Thereafter, the vehicle stops in the condition where the 2nd position is selected. As a result, the next starting of the vehicle is performed using the 2nd position.

In the example shown in FIG. 11 B, the operating mode is shifted to the 2nd position starting mode at a time t3. Although the vehicle speed does not become so high, the shift-down is instructed by the driver at a time t4. Accordingly, the 2nd position starting mode is cancelled and the instructed shift position FMAP is set to the 1st position, so that the shift-down to the 1st position is performed. As a result, the next starting of the vehicle is performed using the 1st position as usual.

Figure 12A:
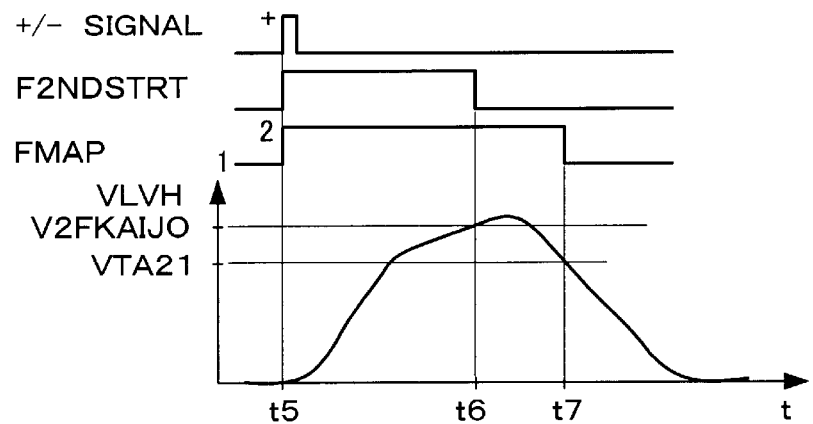
FIGS. 12A and 12B are time charts showing actual operating examples of the M range control shown in FIG. 5.
Figure 12B:
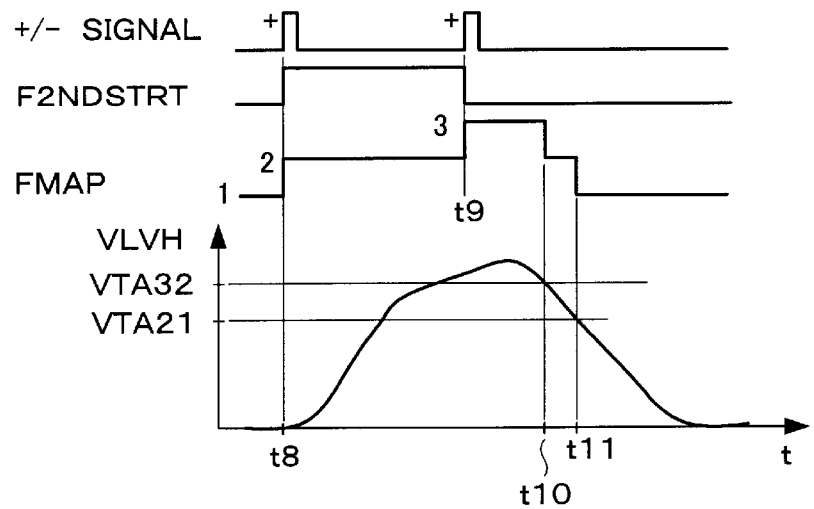

FIGS. 12A and 12B are time charts illustrating operational examples where the M range is selected which are similar to the examples shown in FIG. 11A and 11B. When the shift-up is instructed by the driver (at a time t5 or t8) in the condition where the vehicle speed VLVH is very low and the instructed shift position FMAP is in the 1st position, the shift-up to the 2nd position is performed, and the 2nd position starting flag F2NDSTRT is then set to "1" so that the operating mode is changed to the 2nd position starting mode. In the example shown in FIG. 12A, since the vehicle speed VLVH exceeds the 2nd position start releasing vehicle speed V2FKAIJO at a time t6, the 2nd position starting mode is cancelled (F2NDSTRT is "0"). Accordingly, the shift-down to the 1st position is peformed at a time t7 at which the vehicle speed VLVH decreases to the 2nd-to-1st position shift-down vehicle speed VTA21. Thereafter, the vehicle stops in the condition where the 1st position is selected. As a result, the next starting of the vehicle is performed using the 1st position as usual.

In the example shown in FIG. 12B, the shift-up is instructed by the driver at a time t9, and the shift-up to the 3rd position is performed. At the same time, the 2nd position starting mode is cancelled (F2NDSTRT is "0") in accordance with the driver's shift-up instruction to the 3rd position. Thereafter, when the vehicle speed VLVH decreases to the 3rd-to-2nd shift-down vehicle speed VTA32 at a time t10, the shift-down from the 3rd position to the 2nd position is performed. When the vehicle speed VLVH further decreases to the 2nd-to-1st position shift-down vehicle speed VTA21 at a time t11, the shift-down from the 2nd position to the 1st position is performed. As a result, the next starting of the vehicle is performed using the 1st position as usual.

In this embodiment, the operating mode in which the M range is selected corresponds the manual operating mode. Additionally, the operating mode in which the D range or D3 range is selected corresponds to the automatic operating mode. In the manual operating mode, the mode in which the ordinary 1st position starting is performed corresponds to the first control mode, and the 2nd position starting mode corresponds to the second control mode.

In this embodiment, the ECU 5 constitutes a slow running intention detecting means, a slow running intention cancellation detecting means, a starting shift position setting means, a control mode selecting means, and a shift control means. More specifically, steps 21 to 23 as shown in FIG. 6 correspond to the slow running intention detecting means. Steps S26 to S29 as shown in FIG. 6 correspond to the slow running cancellation detecting means. Steps S24, S30 and S31 in FIG. 6 correspond to the starting shift position setting means or the control mode selecting means. Steps S1, S3 to S5 as shown in FIG. 3 and steps S15 to S18 shown in FIG. 5 correspond to the shift control means.

The ECU 5 also constitutes a slow running intention detecting module, a slow running intention cancellation detecting module, a starting shift position setting module, a control mode selecting module, and a shift control module. More specifically, steps 21 to 23 as shown in FIG. 6 correspond to the slow running intention detecting module. Steps S26 to S29 as shown in FIG. 6 correspond to the slow running cancellation detecting module. Steps S24, S30 and S31 in FIG. 6 correspond to the starting shift position setting module or the control mode selecting module. Steps S1, S3 to S5 as shown in FIG. 3 and steps S15 to S18 as shown in FIG. 5 correspond to the shift control module.

The present invention is not limited to the above-described embodiment but may be variously modified. For example, in the above-described embodiment, the 2nd position starting mode is selected or cancelled according to the driver's intention to slow the vehicle in the manual operating mode (when the M range is selected in the automatic transmission having the M range). However, the present invention can be applied to an automatic transmission with no manual operating mode. In this case, the 2nd position starting mode is selected when there is a cancellation of an accelerating intention of the driver (the slow running intention of the driver) is detected according to time series data of the vehicle speed VLVH and the throttle opening angle THA as disclosed in Japanese Patent Laid-open No. Hei 7-286664, that is, when the running of a vehicle in a traffic congestion is detected. Further, when a depressing rate of an accelerator pedal exceeds a predetermined rate or the vehicle speed becomes equal to or greater than a predetermined vehicle speed, it is determined that the driver has an accelerating intention (the slow running intention of the driver is cancelled), and the 2nd position starting mode is changed to the 1st position starting mode.

What is claimed is:

1. A control system for an automatic transmission of a vehicle wherein said automatic transmission being operable in a manual operating mode in which a shift position of said automatic transmission can be changed according to a shift instruction issued by a driver of said vehicle, or in an automatic operating mode in which the shift position is automatically selected, said control system comprising:

slow running intention detecting means for detecting a slow running intention of the driver; and starting shift position setting means for setting a first shift position to a starting shift position at the time of starting said vehicle when the slow running intention of the driver is not detected by said slow running intention detecting means in the manual operating mode, and for setting a second shift position which is lower in transmission gear ratio than said first shift position to the starting shift position when the slow running intention of the driver is detected by said slow running intention detecting means in the manual operating modes, wherein said slow running intention detecting means detects the slow running intention of the driver when a shift-up of said automatic transmission is instructed by the driver in a condition where said first shift position is selected and a running speed of said vehicle is equal to or less than a predetermined low vehicle speed.

2. A control system for an automatic transmission of a vehicle, comprising:

shift control means for controlling a shift position of said automatic transmission according to an operating condition of the vehicle;

slow running intention detecting means for detecting a slow running intention of a driver of said vehicle;

slow running intention cancellation detecting means for detecting cancellation of the slow running intention of the driver; and control mode selecting means for selecting a first control mode in which a first shift position is set to a starting shift position at the time of starting the vehicle when the slow running intention of the driver is not detected by said slow running intention detecting means, and for selecting a second control mode in which a second shift position which is lower in transmission gear ratio than said first shift position is set to the starting shift position when the slow running intention of the driver is detected by said slow running intention detecting means, and for selecting said first control mode when the cancellation of the slow running intention of the driver is detected by said slow running intention cancellation detecting means;

wherein said shift control means controls the shift position of said automatic transmission in the control mode selected by said control mode selecting means.

3. A control system according to claim 2, wherein said slow running intention cancellation detecting means detects that the slow running intention of the driver is cancelled in at least one of the following cases: a case where a depressing rate of an accelerator pedal operated by the driver becomes greater than a predetermined rate; a case where a running speed of the vehicle becomes equal to or greater than a predetermined vehicle speed; a case where the selection of said first shift position is instructed by the driver; and a case where the selection of a third shift position which is lower in transmission gear ratio than said second shift position is instructed by the driver.

4. A control system according to claim 2, wherein said automatic transmission is operable in a manual operating mode in which a shift position of said automatic transmission can be changed according to a shift instruction issued by the driver, and wherein said slow running intention detecting means detects the slow running intention of the driver when a shift-up of said automatic transmission is instructed by the driver in the manual operating mode in a condition where said first shift position is selected and a running speed of said vehicle is equal to or less than a predetermined low vehicle speed.

5. A control system for an automatic transmission of a vehicle, said automatic transmission being operable in a manual operating mode in which a shift position of said automatic transmission can be changed according to a shift instruction issued by a driver of said vehicle, or in an automatic operating mode in which the shift position is automatically selected, said control system comprising:

slow running intention detecting module for detecting a slow running intention of the driver; and starting shift position setting module for setting a first shift position to a starting shift position at the time of starting said vehicle when the slow running intention of the driver is not detected by said slow running intention detecting module in the manual operating mode, and for setting a second shift position which is lower in transmission gear ratio than said first shift position to the starting shift position when the slow running intention of the driver is detected by said slow running intention detecting module in the manual operating mode, wherein said slow running intention detecting module detects the slow running intention of the driver when a shift-up of said automatic transmission is instructed by the driver in a condition where said first shift position is selected and a running speed of said vehicle is equal to or less than a predetermined low vehicle speed.

6. A control system for an automatic transmission of a vehicle, comprising:

shift control module for controlling a shift position of said automatic transmission according to an operating condition of the vehicle;

slow running intention detecting module for detecting a slow running intention of a driver of said vehicle;

slow running intention cancellation detecting module for detecting cancellation of the slow running intention of the driver; and control mode selecting module for selecting a first control mode in which a first shift position is set to a starting shift position at the time of starting the vehicle when the slow running intention of the driver is not detected by said slow running intention detecting module, and for selecting a second control mode in which a second shift position which is lower in transmission gear ratio than said first shift position is set to the starting shift position when the slow running intention of the driver is detected by said slow running intention detecting module, and further for selecting said first control mode when the cancellation of the slow running intention of the driver is detected by said slow running intention cancellation detecting module;

wherein said shift control module controls the shift position of said automatic transmission in the control mode selected by said control mode selecting module.

7. A control system according to claim 6, said slow running intention cancellation detecting module detects that the slow running intention of the driver is cancelled in at least one of the following cases: a case where a depressing rate of an accelerator pedal operated by the driver becomes greater than a predetermined rate; a case where a running speed of the vehicle becomes equal to or greater than a predetermined vehicle speed; a case where the selection of said first shift position is instructed by the driver; and a case where the selection of a third shift position which is lower in transmission gear ratio than said second shift position is instructed by the driver.

8. A control system according to claim 6, wherein said automatic transmission is operable in a manual operating mode in which a shift position of said automatic transmission can be changed according to a shift instruction issued by the driver, and wherein said slow running intention detecting module detects the slow running intention of the driver when a shift-up of said automatic transmission is instructed by the driver in the manual operating mode in a condition where said first shift position is selected and a running speed of said vehicle is equal to or less than a predetermined low vehicle speed.

9. A control method for an automatic transmission of a vehicle, said automatic transmission being operable in a manual operating mode in which a shift position of said automatic transmission can be changed according to a shift instruction issued by a driver of said vehicle, or in an automatic operating mode in which the shift position is automatically selected, said control method comprising the steps of:

a) detecting a slow running intention of the driver; and b) setting a first shift position to a starting shift position at the time of starting said vehicle when the slow running intention of the driver is not detected in the manual operating mode; and c) setting a second shift position which is lower in transmission gear ratio than said first shift position to the starting shift position when the slow running intention of the driver is detected in the manual operating mode, wherein the slow running intention of the driver is detected when a shift-up of said automatic transmission is instructed by the driver in a condition where said first shift position is selected and a running speed of said vehicle is equal to or less than a predetermined low vehicle speed.

10. A control method for an automatic transmission of a vehicle, comprising the steps of:

a) detecting a slow running intention of a driver of said vehicle;

b) detecting cancellation of the slow running intention of the driver;

c) selecting a first control mode in which a first shift position is set to a starting shift position at the time of starting the vehicle when the slow running intention of the driver is not detected;

d) selecting a second control mode in which a second shift position which is lower in transmission gear ratio than said first shift position is set to the starting shift position when the slow running intention of the driver is detected;

e) selecting said first control mode when the cancellation of the slow running intention of the driver is detected; and f) controlling a shift position of said automatic transmission in the selected control mode, according to an opening condition of the vehicle.

11. A control method according to claim 10, wherein the cancellation of the slow running intention of the driver is detected in at least one of the following cases: a case where a depressing rate of an accelerator pedal operated by the driver becomes greater than a predetermined rate; a case where a running speed of the vehicle becomes equal to or greater than a predetermined vehicle speed; a case where the selection of said first shift position is instructed by the driver; and a case where the selection of a third shift position which is lower in transmission gear ratio than said second shift position is instructed by the driver.

12. A control method according to claim 10, wherein said automatic transmission is operable in a manual operating mode in which a shift position of said automatic transmission can be changed according to a shift instruction issued by the driver, and wherein the slow running intention of the driver is detected when a shift-up of said automatic transmission is instructed by the driver in the manual operating mode in a condition where said first shift position is selected and a running speed of said vehicle is equal to or less than a predetermined low vehicle speed.

* * * * *